United States Patent Office.

PAUL SEIDEL, OF LUDWIGSHAFEN, GERMANY, ASSIGNOR TO BADISCHE ANILIN & SODA FABRIK, OF LUDWIGSHAFEN, BAVARIA, GERMANY, A CORPORATION OF BADEN.

ACID SALT OF PHENYL-GLYCOCOL-ORTHO-CARBOXYLIC ACID AND PROCESS OF MAKING SAME.

SPECIFICATION forming part of Letters Patent No. 690,325, dated December 31, 1901.

Application filed May 27, 1901. Serial No. 62,126. (No specimens.)

*To all whom it may concern:*

Be it known that I, PAUL SEIDEL, doctor of philosophy and chemist, a subject of the King of Saxony, residing at Ludwigshafen-on-the-Rhine, in the Kingdom of Bavaria, Germany, have invented new and useful Improvements in Processes for the Production of Phenyl-Glycocol-Ortho-Carboxylic Acid and Acid Salts Thereof, of which the following is a specification.

My invention relates to a process for producing phenyl-glycocol-ortho-carboxylic acid. The processes hitherto known for the production of this body all present drawbacks. Thus if anthranilic acid be treated in aqueous solution with chlor-acetic acid and an excess of carbonate of soda considerable quantities of an acid which may be termed "anthranilo-di-acetic" acid are formed and at the same time a considerable portion of the anthranilic acid used remains unchanged, and if anthranilic acid and mono-chlor-acetic acid be heated together in aqueous solution in a vessel provided with an inverted condenser the hydrochloric acid produced is liable to cause a decomposition of the product desired, and so the yield suffers, and if in this process some carbonate of soda be added in order to neutralize the hydrochloric acid formed (see Heumann, *Berichte*, Vol. 23, page 3432) some decomposition takes place.

The process, according to my invention, consists in bringing the anthranilic acid and chlor-acetic acid into reaction with one another in aqueous solution in the form of their neutral salts, or a sufficient quantity of a suitable base can be added to the solution of equimolecular proportions of the acids, so as to neutralize them. The advantages of my process are that the reaction proceeds smoothly at a low temperature, so that a decomposition of the phenyl-glycocol-ortho-carboxylic acid formed is avoided. On the other hand, owing to the formation of hydrochloric acid during the reaction a new acid salt of phenyl-glycocol-ortho-carboxylic acid is obtained, and this is almost entirely insoluble in cold water and only slightly soluble in moderately-warm water, so that as it forms it separates almost completely from the solution and is consequently removed from any further reaction with the chlor-acetic acid, so that the formation of anthranilo-di-acetic acid is hindered. The reaction may be effected in the cold, in which case it proceeds slowly; but if the temperature be raised—say to about forty (40°) degrees centigrade—a rapid reaction sets in, which, however, gradually proceeds more slowly. The new acid salt of the phenyl-glycocol-ortho-carboxylic acid soon begins to separate out. It can be collected and the mother-liquor again warmed or allowed to stand for a long time, if desired, after being enriched by the addition of a further quantity of the alkaline salts of anthranilic acid and chlor-acetic acid and in this way a further quantity of the desired product obtained.

The following example will serve to further illustrate the nature of my invention and the manner in which the same may be carried into practical effect; but the invention is not confined to the reactions exemplified. The parts are by weight.

Example: Prepare the neutral sodium salt of anthranilic acid by stirring about one hundred and thirty-seven (137) parts of anthranilic acid to a paste with thirty (30) parts of water and neutralizing the acid by the addition of about one hundred and twenty (120) parts of caustic-soda lye, (containing about thirty-five per cent. of NaOH.) Add to this solution at a low temperature one hundred and sixteen (116) parts of sodium chlor-acetate dissolved in two hundred (200) parts of water. Warm the mixture to about forty (40°) degrees centigrade and maintain this temperature for several days. Collect the acid salt which separates out by centrifugal action. Instead of sodium salt potash or ammonia salts or the salts of the alkaline earths can be employed.

The chemical composition of my new salt can be expressed by the formula:

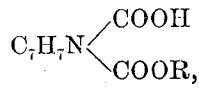

where R represents one equivalent of an alkaline metal, such as sodium or ammonium, or half an equivalent of a metal of the alkaline earths, such as barium. It is exceedingly difficultly soluble in cold water and but slightly soluble in water heated to forty (40°) degrees centigrade. It can be obtained by crystallization from warm water in almost-colorless crystals.

The sodium salt which I wish to claim specifically can be represented by the formula:

$$C_7H_7N\begin{cases}COOH\\COONa.\end{cases}$$

It is soluble in water at twenty-three (23°) degrees centigrade to the extent of about one and a half (1½) per cent. It can be obtained by crystallization from warm water in almost-colorless crystals.

Now what I claim is—

1. The process for the production of phenyl-glycocol-ortho-carboxylic acid in the form of its acid salts by causing anthranilic acid and chlor-acetic acid to react upon one another in aqueous solution in the form of their neutral salts, substantially as described.

2. As a new body the acid salt of phenyl-glycocol-ortho-carboxylic acid, whose chemical composition can be expressed by the formula $$C_7H_7N\begin{cases}COOH\\COOR,\end{cases}$$

which is exceedingly difficultly soluble in cold water and but slightly soluble in warm water, which can be obtained by crystallization from water in almost-colorless crystals, substantially as described.

3. As a new body the acid sodium salt of phenyl-glycocol-ortho-carboxylic acid whose chemical composition can be expressed by the formula $$C_7H_7N\begin{cases}COOH\\COONa,\end{cases}$$

which is soluble in water at twenty-three (23°) degrees centigrade to the extent of about one and a half (1½) per cent. and which can be obtained by crystallization from warm water in almost-colorless crystals, substantially as described.

In testimony whereof I have hereunto set my hand in the presence of two subscribing witnesses.

PAUL SEIDEL.

Witnesses:
JOHN L. HEINKE,
PERCY J. JONES.